United States Patent
Hanley (10) Patent No.: US 12,301,107 B2
(45) Date of Patent: May 13, 2025

(54) METHODS AND EQUIPMENT FOR REDUCING POWER LOSS IN RADIO SYSTEMS

(71) Applicant: Outdoor Wireless Networks LLC, Claremont, NC (US)

(72) Inventor: John T. Hanley, Orland Park, IL (US)

(73) Assignee: Outdoor Wireless Networks LLC, Richardson, TX (US)

( * ) Notice: Subject to any disclaimer, the term of this patent is extended or adjusted under 35 U.S.C. 154(b) by 25 days.

(21) Appl. No.: 18/546,072

(22) PCT Filed: Feb. 14, 2022

(86) PCT No.: PCT/US2022/016300
§ 371 (c)(1),
(2) Date: Aug. 10, 2023

(87) PCT Pub. No.: WO2022/177850
PCT Pub. Date: Aug. 25, 2022

(65) Prior Publication Data
US 2024/0120834 A1    Apr. 11, 2024

Related U.S. Application Data (60) Provisional application No. 63/149,747, filed on Feb. 16, 2021.

(51) Int. Cl.
H02M 3/04    (2006.01)
(52) U.S. Cl.
CPC .................................. H02M 3/04 (2013.01)

(58) Field of Classification Search
None
See application file for complete search history.

(56) References Cited

U.S. PATENT DOCUMENTS

| 9,448,576 B2 | 9/2016 | Chamberlain et al. |
| 10,396,844 B2 * | 8/2019 | Coleman ................ H05K 7/209 |

(Continued)

FOREIGN PATENT DOCUMENTS

| JP | 2002300118 A | 10/2002 |
| JP | 6006251 B2 | 10/2016 |

(Continued)

OTHER PUBLICATIONS

International Searching Authority, "International Search Report and Written Opinion", from PCT Application No. PCT/US2022/016300, Jun. 2, 2022, pp. 1 through 10, Published: WO.

(Continued)

*Primary Examiner* — Jeffrey S Zweizig
(74) *Attorney, Agent, or Firm* — Fogg & Powers LLC (57) ABSTRACT

Methods and systems of powering a radio that can be mounted on a tower of a wireless communication system are provided in which a direct current ("DC") voltage is provided to the radio over a power cable from a power supply configured to change the direct current (DC) output from the power supply based on a measured current level. The power supply is configured to change the DC voltage from a first voltage level to a second voltage level in response to the measured current being greater than or equal to a first threshold value.

24 Claims, 5 Drawing Sheets

(56) References Cited

U.S. PATENT DOCUMENTS

| | | |
|---|---|---|
| 10,470,120 B2 * | 11/2019 | Fischer ............... H04W 52/346 |
| 10,499,330 B2 * | 12/2019 | Coleman ................... G05F 1/62 |
| 10,812,664 B2 | 10/2020 | Kostakis et al. |
| 11,129,095 B2 | 9/2021 | Gandhi |
| 2013/0059554 A1 | 3/2013 | Ripley et al. |
| 2013/0173186 A1 | 7/2013 | Lim et al. |
| 2015/0009600 A1 | 1/2015 | Aromin et al. |
| 2018/0176861 A1 | 6/2018 | Chamberlain et al. |
| 2018/0213091 A1 | 7/2018 | Kostakis et al. |
| 2018/0275711 A1 | 9/2018 | Johnson et al. |
| 2018/0335456 A1 | 11/2018 | Cook |
| 2019/0289541 A1 | 9/2019 | Fischer |

FOREIGN PATENT DOCUMENTS

| | | |
|---|---|---|
| WO | 9958992 A2 | 11/1999 |
| WO | 2022177850 A1 | 8/2022 |
| WO | 2022177857 A1 | 8/2022 |

OTHER PUBLICATIONS

International Searching Authority, "International Search Report and Written Opinion", from PCT Application No. PCT/US2022/016321, Jun. 2, 2022, pp. 1 through 9, Published: WO.

European Patent Office, "Extended European Search Report", dated Jan. 9, 2025, from U.S. Appl. No. 18/546,072, from Foreign Counterpart to U.S. Appl. No. 18/546,072, pp. 1 through 31, Published: EP.

* cited by examiner

METHODS AND EQUIPMENT FOR REDUCING POWER LOSS IN RADIO SYSTEMS

CROSS REFERENCE TO RELATED APPLICATIONS

This application is related to U.S. patent application Ser. No. 63/149,740, filed Feb. 16, 2021, and titled "SYSTEMS AND METHODS TO REDUCE CABLE HEATING IN RADIO COMMUNICATIONS," the contents of which are incorporated herein by reference in its entirety. This application claims priority to International Patent Application No. PCT/US2022/016300, filed on Feb. 14, 2022, which claims the benefit of U.S. patent application Ser. No. 63/149,747, filed Feb. 16, 2021, and titled "METHODS AND EQUIPMENT FOR REDUCING POWER LOSS IN RADIO SYSTEMS," the contents of which are incorporated herein by reference in their entirety.

BACKGROUND

Cellular base stations typically include, among other things, a radio, a baseband unit, and one or more antennas. The radio receives digital information and control signals from the baseband unit and modulates this information into a radio frequency ("RF") signal that is transmitted through the antennas. The radio also receives RF signals from the antenna and demodulates these signals and supplies them to the baseband unit. The baseband unit processes demodulated signals received from the radio into a format suitable for transmission over a backhaul communications system. The baseband unit also processes signals received from the backhaul communications system and supplies the processed signals to the radio. A power supply may also be provided that generates suitable direct current ("DC") power signals for powering the baseband unit and the radio. For example, the radio is often powered by a (nominal) 48 Volt DC power supply in cellular systems that are currently in use today. A battery backup can also be provided to maintain service for a limited period of time during power outages.

In order to increase coverage and signal quality, the antennas in many cellular base stations are located at the top of an antenna tower, which may be, for example, about fifty to two hundred feet tall. Antennas are also routinely mounted on other elevated structures such as, for example, buildings, utility poles, and the like. Until fairly recently, the power supply, baseband unit, and radio were all located in an equipment enclosure at the bottom of the antenna tower or other elevated structure to provide easy access for maintenance, repair and/or later upgrades to the equipment. Coaxial cable(s) were routed from the equipment enclosure to the top of the antenna tower and were used to carry RF signals between the radios and the antennas.

Figure 1:
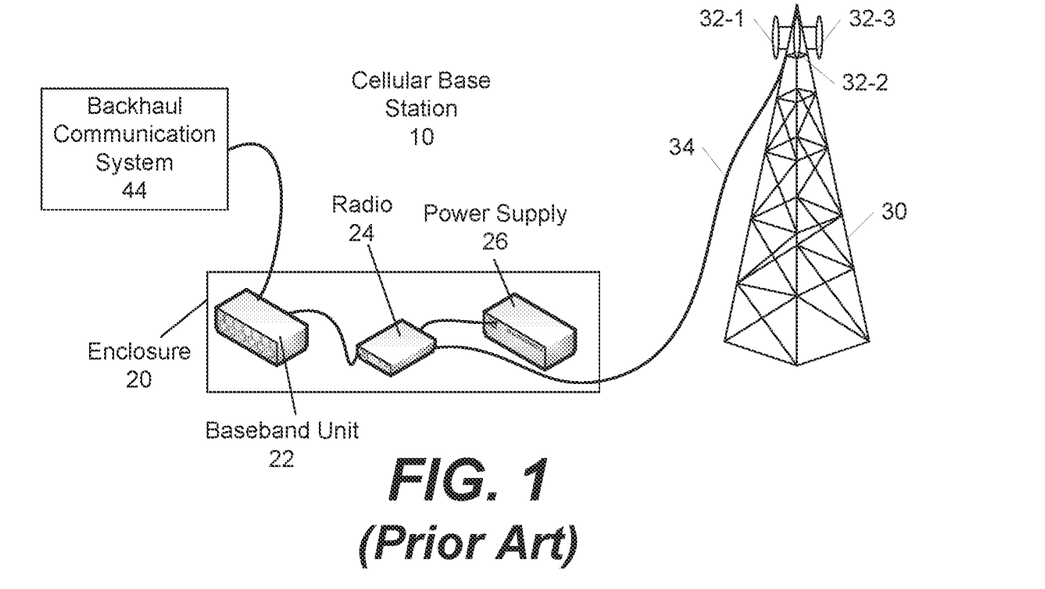
FIG. 1 illustrates a simplified, schematic view of a traditional cellular base station architecture.

FIG. 1 is a schematic diagram that illustrates a conventional cellular base station 10. As shown in FIG. 1, the depicted cellular base station 10 includes an equipment enclosure 20 and an antenna tower 30. The equipment enclosure 20 can be located at the base of the antenna tower 30, as shown in FIG. 1. A baseband unit 22, a radio 24, and a power supply 26 are located within the equipment enclosure 20. The baseband unit 22 may be in communication with a backhaul communications system 44. A plurality of antennas 32 (e.g., three sectorized antennas 32-1, 32-2, 32-3) are located at the top of the antenna tower 30. Three coaxial cables 34 (which are bundled together in FIG. 1 to appear as a single cable) connect the radio 24 to the antennas 32.

While the cellular base station 10 of FIG. 1 (and various other cellular base stations shown in subsequent Figures) is shown as a having a single baseband unit 22 and radio 24 to simplify the drawings and description, it will be appreciated that cellular base stations may have multiple baseband units 22 and radios 24 (and additional antennas 32), with three, six, nine, or even twelve baseband units 22 and radios 24.

However, the radio 24 can also be located at the top of the tower 30 in other cellular installations. Radios that are located at the top of the tower 30 may be remote radio heads ("RRH") 24'. Using remote radio heads 24' may significantly improve the quality of the cellular data signals that are transmitted and received by the cellular base station, as the use of remote radio heads 24' may reduce signal transmission losses and noise. In particular, as the coaxial cables 34 that connect radios 24 that are located at the base of an antenna tower 30 to antennas 32 that are mounted near the top of the antenna tower 30 may have lengths of 100-200 feet or more, the signal loss that occurs in transmitting signals at cellular frequencies (e.g., 1.8 GHz, 3.0 GHz, etc.) over these coaxial cables 34 may be significant, as at these frequencies the coaxial cables 34 tend to radiate RF signal energy. Because of this loss in signal power, the signal-to-noise ratio of the RF signals may be degraded in systems that locate the radio 24 at the bottom of the antenna tower 30 as compared to cellular base stations having remote radio heads 24' that are located at the top of the tower 30 next to the antennas 32 (note that signal losses in the cabling connection between the baseband unit 22 at the bottom of the tower 30 and the remote radio head 24' at the top of the tower 30 may be much smaller, as these signals are transmitted at baseband or intermediate frequencies as opposed to RF frequencies, and because these signals may be transmitted up the antenna tower 30 over fiber optic cables, which may exhibit lower losses).

Figure 2:
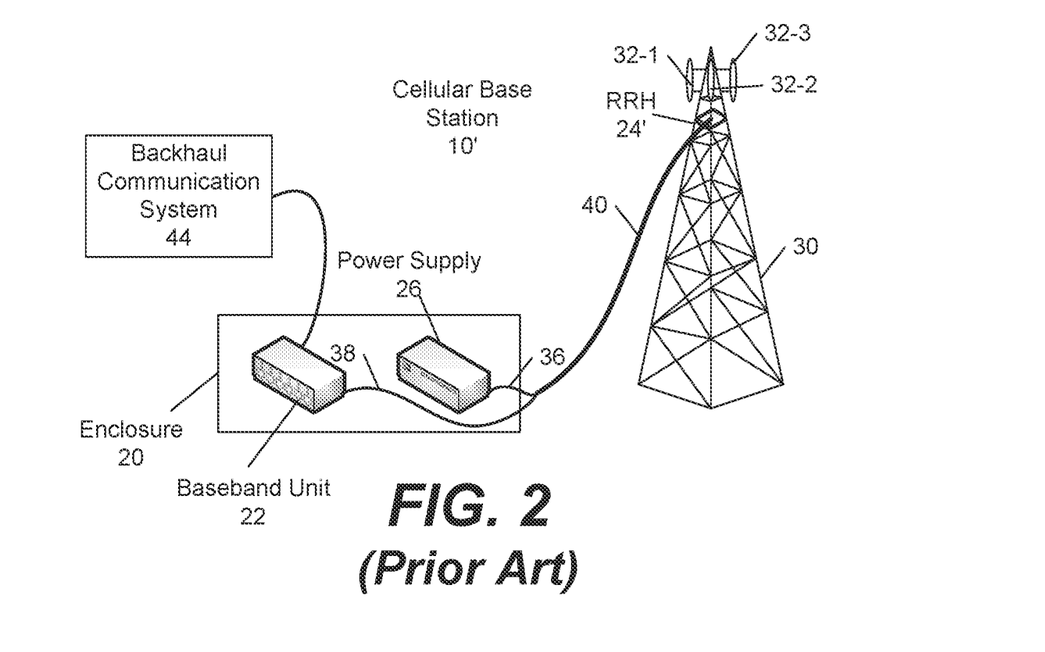
FIG. 2 illustrates a simplified, schematic view of a conventional cellular base station in which a remote radio head is located at the top of the antenna tower.

FIG. 2 is a schematic diagram that illustrates a cellular base station 10' according to this newer architecture. As shown in FIG. 2, the baseband unit 22 and the power supply 26 may still be located at the bottom of the tower 30 in the equipment enclosure 20. The radio 24 in the form of a remote radio head 24' is located at the top of the tower 30 immediately adjacent to the antennas 32. While the use of tower-mounted remote radio heads 24' may improve signal quality, it also, unfortunately, requires that DC power be delivered to the top of the tower 30 to power the remote radio head 24'. As shown in FIG. 2, a fiber optic cable 38 connects the baseband unit 22 to the remote radio head 24' (as fiber optic links may provide greater bandwidth and lower loss transmissions), and a separate or combined ("composite") power cable 36 is provided for delivering the DC power signal to the remote radio head 24'. The separate power cable 36 can be bundled with the fiber optic cable 38 so that they may be routed up the tower 30 together. In other embodiments, a hybrid fiber optic/power trunk cable 40 may be run up the tower 30. Such trunk cables 40 can have junction enclosures on either end thereof, and a first set of data and power jumper cables are used to connect the junction enclosure on the ground end of the trunk cable 40 to the baseband unit(s) 22 and power supply 26, and a second set of data and power (or combined data/power) jumper cables are used to connect the junction enclosure at the top of the tower 30 to the remote radio heads 24'.

Another change that has occurred in the cellular industry is a rapid increase in the number of subscribers as well as a dramatic increase in the amount of voice and data traffic transmitted and received by a subscriber. In response to this change, the number of remote radio heads 24' and antennas 32 that are being mounted on a typical antenna tower 30 has also increased, with twelve remote radio heads 24' and twelve or more antennas 32 being a common configuration today. Additionally, higher power remote radio heads 24' are also being used. These changes may result in increased weight and wind loading on the antenna towers 30 and the need for larger, more expensive trunk cables 40.

SUMMARY

In one embodiment, a power system is provided. The power system comprises input conductors configured to receive a first direct current (DC) voltage level, and output conductors configured to provide a DC voltage to a first end of a power cable electrically coupled to a radio. The power system further comprises a current sensor electrically coupled to the output conductors. The current sensor is configured to measure a current flowing through the output conductors. The power system further comprises a converter circuit electrically coupled to the input conductors and the output conductors. The converter circuit configured to change the first DC voltage level to a second DC voltage level in response to the measured current being greater than a first threshold level. The second DC voltage level is greater than the first DC voltage level. The output conductors are configured to provide at least one of the first DC voltage level and the second DC voltage level.

BRIEF DESCRIPTION OF THE DRAWINGS

Exemplary features of the present disclosure, its nature and various advantages will be apparent from the accompanying drawings and the following detailed description of various embodiments. Non-limiting and non-exhaustive embodiments are described with reference to the accompanying drawings, wherein like labels or reference numbers refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Pursuant to embodiments of the present disclosure, methods for delivering DC power to a radio are disclosed. Radio means a remote radio head ("RRH"), remote radio unit, active antenna unit, or any other type of radio. The radio may be used at a radio station. The radio station means a cellular base station, a fixed wireless access radio station, distributed antenna system, or any other type of radio station. The radio station comprises at least one radio, at least one programmable power supply, at least one electrical power conductor, and other equipment. Embodiments of the invention reduce the power loss associated with delivering a DC voltage to the radio in a radio system. For pedagogical reasons the radio will be described as a remote radio head, though other types of radios also fall within the scope of the disclosure. A cellular communications system (e.g., comprising a cellular base station and a remote radio head) will also be described hereinafter for pedagogical illustration understanding that embodiments of the invention are applicable to other types of radio systems. The electrical power conductors are configured to provide DC electrical power from a power supply, e.g., a voltage converter, to a radio. The electrical power conductors may comprise at least one power cable, at least one overvoltage protection circuit, at least one circuit breaker, at least one busbar, and/or any other electrical component(s). For pedagogical purposes, the electrical power conductors are illustrated as a power cable. Power signal means electrical power.

In an embodiment, the radio is a remote radio head that is optionally located at the top of a tower. The power supply can provide DC voltage at the base of the tower (e.g., in an enclosure 20) of a cellular base station to the remote radio head located at the top of the tower through a cabling connection, such as one or more power cables. However, while illustrated in FIG. 1 and pedagogically described below, such configuration is merely exemplary and not required.

Since the voltage and currents required to power each remote radio head may be quite high (e.g., about 50 Volts at about 20 Amperes of current), the power loss that may occur along the hundreds of feet of cabling used to connect the remote radio heads mounted on tall antenna towers to a power supply may be significant. On the other hand, the proliferation of cellular base stations having smaller sized service areas (including, e.g., small-cell base stations, micro-cell base stations, and so on) has resulted in installations in which cabling connections are much shorter than in tower configurations (e.g., less than 20 feet).

The DC voltage of a power signal that is supplied to a remote radio head from a power supply over a power cable may be determined as follows:

$$V_{RRH} = V_{PS} - V_{Drop} \quad (1)$$

where $V_{PS}$ is the DC voltage of the power signal that is output by the power supply, $V_{Drop}$ is the resistive loss in the DC voltage that occurs as the DC power signal traverses the power cable connecting the power supply to the remote radio head, and $V_{RRH}$ is the DC voltage of the power signal delivered to the remote radio head. $V_{Drop}$ in Equation (1) may be determined according to Ohm's Law as follows:

$$V_{Drop} = I_{Cable} * R_{Cable} \qquad (2)$$

where $R_{Cable}$ is the cumulative electrical resistance (in Ohms) of the electrical path of the electrical power conductors (e.g., one power cable, or multiple power cables such as in a trunk/jumper power cable configuration) connecting the power supply to the remote radio head, and $I_{Cable}$ is the average current (in Amperes) flowing through the electrical path to, e.g., a DC power input of, the radio (e.g., the remote radio head) and back to the power supply.

Focusing first on the cumulative electrical resistance $R_{Cable}$ of the power cable, the resistance $R_{Cable}$ of a conductor is inversely proportional to the diameter of the conductor of the power cable (assuming the conductors have a circular cross-section). Thus, the larger the diameter of each conductor (i.e., the lower the gauge of the conductor), the lower the resistance of the power cable. Typically, power cables utilize copper conductors due to the low resistance of copper. Copper resistance is specified in terms of unit length, typically milliohms (mΩ)/ft; as such, the cumulative electrical resistance $R_{Cable}$ of the power cable increases with the length of the power cable. Thus, the longer the power cable, the higher the voltage drop $V_{Drop}$.

However, as $V_{Drop}$ is a function of the current $I_{Cable}$ that is supplied to the remote radio head (see Equation (2) above), if $V_{PS}$ (the voltage output by the power supply) is constant, then the voltage $V_{RRH}$ of the power signal that is delivered to the remote radio head will change with the variation in current $I_{Cable}$ drawn by the remote radio head from the power supply. For example, when a first current is drawn by the remote radio head (e.g., a low-load condition), the voltage $V_{Drop}$ will be less than when a second, higher current is drawn by the remote radio head (e.g., a higher-load condition).

A manufacturer of a remote radio head may specify three input voltages: a minimum required voltage for the power signal, a nominal voltage for the power signal, and a maximum voltage for the power signal. As used herein, nominal voltage means an output DC voltage corresponding to the input DC voltage received by a power system (e.g., the second or programmable power supply 150 as described below) that is output to the radio. A nominal voltage is not a boosted output voltage. Thus, the power supply at the base of the tower must output a voltage $V_{PS}$ such that $V_{RRH}$ will be between the minimum and maximum specified voltages for the power signal of the remote radio head. Note that some installations are positive ground systems in which in which the nominal or recommended supply voltage is a negative value, such as negative 48V, and the return or common is ground and 0V. Herein, to avoid potential confusion, the voltage of a power signal will refer to the absolute value of the voltage difference between the supply conductor and the return conductor, regardless as to whether a positive ground or negative ground system is used. In other words, a first power signal having a voltage of 52V has a larger voltage than a second power signal having a voltage of 48V, even if the supply of the first power signal is −52V and the supply of the second power signal is −48V.

Conventionally, the voltage output of the power signal by the power supply ($V_{PS}$) has been set to ensure that a power signal having the nominal specified voltage is supplied to the remote radio head (or at least a value above the minimum required voltage for the power signal) when the remote radio head draws the maximum anticipated amount of current from the power supply.

In some more recent installations, the power supply may be set to output a DC voltage that is at the maximum voltage for the specified remote radio head, such that when it arrives at the remote radio head, it will have a voltage that is below the maximum voltage specified for the remote radio head. This reduces power loss over the cable. For example, the power that is lost ($P_{Loss}$) in delivering the power signal to the remote radio head over a power cable may be calculated as follows:

$$\begin{aligned}P_{Loss} &= V_{Drop} * I_{Cable} = (I_{Cable} * R_{Cable}) \\ &\quad * I_{Cable} = I_{Cable}^2 * R_{Cable}\end{aligned} \qquad (3)$$

In order to reduce or minimize $P_{Loss}$, the higher the voltage of the power signal that is delivered to the remote radio head, the lower the current $I_{Cable}$ of the power signal on the power cable, and the lower the current $I_{Cable}$ of the power signal on the power cable, the lower the power loss $P_{Loss}$.

The present disclosure is based on a recognition that configuring a power supply to output an input DC voltage to an even higher output voltage (i.e., a "boost" voltage) that exceeds a maximum voltage for the specified remote radio head may further reduce power loss over the cable. In other words, since a voltage drop will occur in the electrical path between the power supply and the remote radio head, it may be possible to advantageously utilize the occurring voltage drop in the electrical path in a cost-effective manner. Accordingly, the present disclosure provides a power system (e.g., a power supply) configured to output a DC power signal having an output voltage (i.e., a "boost" voltage) that exceeds a maximum voltage for a remote radio head coupled to and powered by the power supply via an electrical path.

However, there has been a proliferation of installation sites and site configurations for base station equipment. The present disclosure is also based on a recognition that a "boost" voltage that exceeds a maximum voltage for a remote radio head coupled to and powered by the power supply via an electrical path might not be appropriate for all installations and/or for all operating conditions. For example, outputting a boost voltage from the power supply may be appropriate only if the voltage drop in the electrical path between the power supply and the remote radio head is sufficient such that when the power signal arrives at the input to the remote radio head, the voltage of the power signal is at or below the maximum voltage specified for the remote radio head. If the voltage drop over the electrical path is too low, potential damage to the remote radio head from an overvoltage condition may occur. As such, aspects of the present disclosure provide a power supply configured to detect characteristics or properties of an installation, and/or characteristics or properties of operating conditions of the power supply, and based on detecting that appropriate characteristics or properties exist, selectively output a power signal having a boost voltage that exceeds a maximum voltage for a remote radio head coupled to and powered by the power supply via an electrical path.

One example of a characteristic is the cumulative electrical resistance (in Ohms) of the electrical path $R_{Path}$, and the average current (in Amperes) flowing through the electrical path $I_{Path}$. The resistance of the electrical path $R_{Path}$ depends on the composition of the electrical path, such as the conductor material(s), length(s), and cross-section(s), although there are other factors as well, such as ambient temperature. Given two electrical paths of equal cross-section and uniform composition, one factor will be the differing length of the paths, with an increase in resistance per unit length, e.g., milliohms (mΩ)/ft. Separately, the average current $I_{Path}$ depends on the load of the power supply, in this case the remote radio head. For example, a remote radio head servicing more user equipment will draw more current than a remote radio head servicing less user equipment.

Figure 7A:
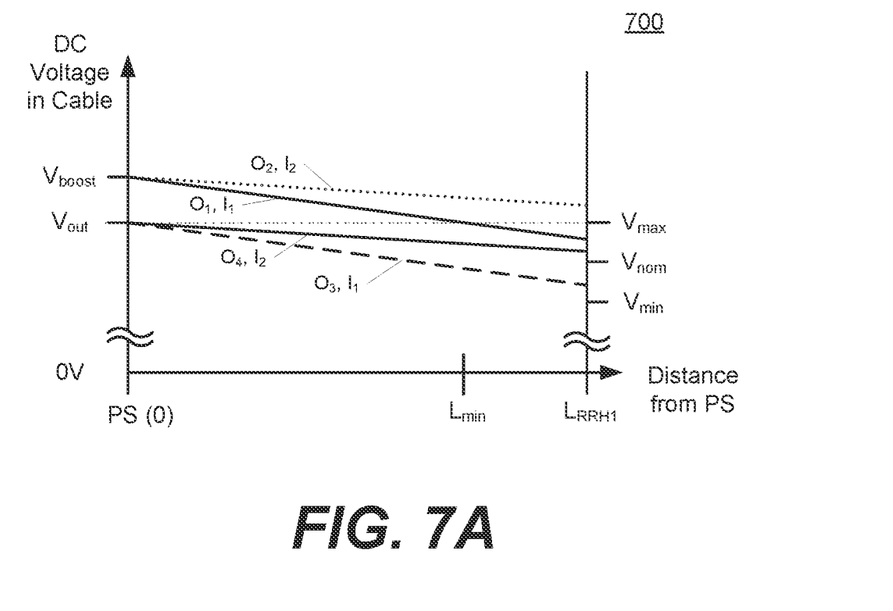
FIGS. 7A and 7B are graphs illustrating various embodiments of outputs used to detect characteristics of a power system.
Figure 7B:
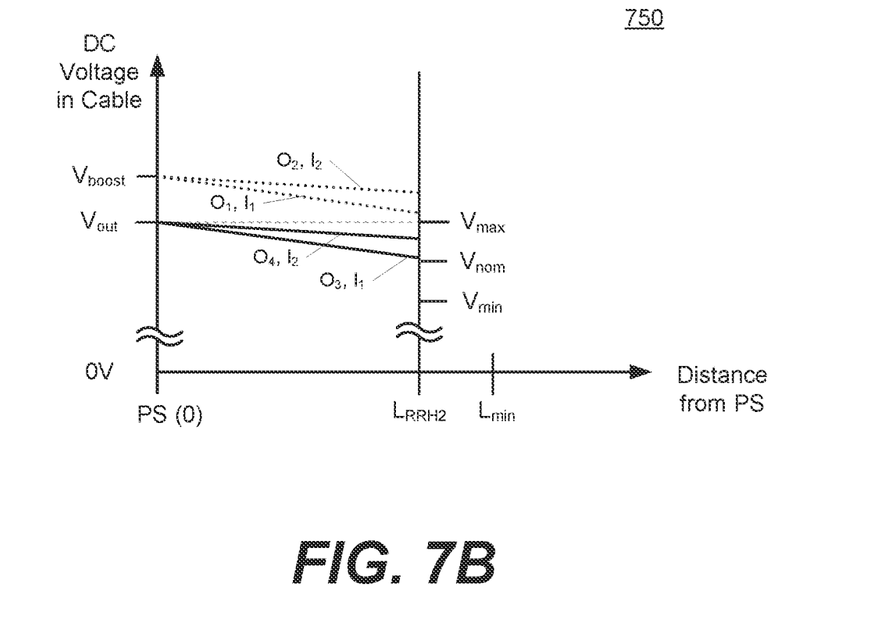

To illustrate the impact of these various characteristics for purposes of discussion, reference is made to FIGS. 7A and 7B, which illustrate various outputs $O_1$ to $O_4$ from a power supply configured to detect characteristics or properties of an installation, and/or characteristics or properties of operating conditions of the power supply, and configured to output selectively a boost voltage that exceeds a maximum input voltage of a remote radio head electrically coupled to the power supply via an electrical path when conditions detected by the power supply indicate it is appropriate to output the boost voltage. Outputs $O_1$ and $O_2$ may have a boost voltage $V_{boost}$, and outputs $O_3$ and $O_4$ may have a nominal output voltage $V_{out}$. Outputs $O_1$ and $O_3$ may be outputs having a first current level $I_1$, and outputs $O_2$ and $O_4$ may be outputs having a second (lower) current level 12. In FIG. 7A and graph 700 thereof, a distance between the power supply PS and the remote radio head may be a distance $L_{RRH1}$. In FIG. 7B and graph 750 thereof, a distance between the power supply PS and the remote radio head may be a distance $L_{RRH2}$. The outputs illustrated in FIGS. 7A and 7B are merely examples for convenience of description. Between FIGS. 7A and 7B, it is assumed that the electrical paths are equal cross-section and uniform composition, with the only difference being the differing length of the paths $L_{RRH1}$ and $L_{RRH2}$.

According to some embodiments, the power supply PS may be configured to output as a default a DC output power signal having a nominal output DC voltage ($V_{out}$) that is approximately equal to the maximum voltage for the specified remote radio head ($V_{max}$), based on the understanding that when the power signal arrives at the remote radio head, it will have a voltage that is below the maximum voltage specified for the remote radio head due to power loss within the electrical path. Reference is made to the outputs $O_3$ and $O_4$ of both FIGS. 7A and 7B, which are the outputs having the nominal output voltage of the PS ($V_{out}$) for both shown currents $I_1$ and $I_2$, where $I_1 > I_2$. As seen in the figures, regardless of the distance between the power supply PS and the remote radio head, the outputs $O_3$ and $O_4$ fall within the range $V_{min}$ to $V_{max}$, where $V_{min} < V_{nom} < V_{max}$, $V_{min}$ is the minimum input voltage for the remote radio head RRH, and $V_{nom}$ is the recommended input voltage for the remote radio head RRH.

According to some embodiments, the power supply PS may be configured to detect when the current level of the power signal output by the power supply exceeds a current threshold, and whether a distance between the power supply PS and the remote radio head exceeds a predetermined length. Length may be a substitute value for the resistance of the electrical path (e.g., assumptions may be made as to the material and cross-sectional area of the electrical path). If the distance between the power supply PS and the remote radio head exceeds a length threshold, and when the current level of the power signal output by the power supply exceeds a current threshold, then the power supply PS may be configured to output a power signal having a boost voltage ($V_{boost}$) that exceeds a maximum input voltage of the remote radio head. Since the current being drawn by the remote radio head (and/or the measured current level of the DC power signal being output by the power supply) is greater, the DC power signal that arrives at the input to the remote radio head will have a voltage that is below the maximum voltage specified for the remote radio head due to the greater power loss within the electrical path, provided that the length of the electrical path is long enough.

Reference is made to the outputs $O_1$ to $O_4$ of FIG. 7A. As seen, when the length of the electrical path (i.e. $L_{RRH1}$) exceeds a predetermined threshold ($L_{min}$), and although output $O_3$ would be an acceptable power signal for the (higher) first current $I_1$, (since at the input to the remote radio head the power signal would have a voltage that falls within the acceptable input range for the remote radio head), the power supply PS may preferentially output $O_1$ instead of $O_3$, and as such output a DC power signal that has the boost output voltage $V_{boost}$. Output $O_1$ would be a preferred power signal for the (higher) first current $I_1$ than output $O_3$, since due to the power loss within the electrical path, the boost power signal at the input to the remote radio head would also have a voltage that falls within the acceptable input range $V_{min}$ to $V_{max}$ for the remote radio head, but at the higher voltage $V_{boost}$ the power loss would be lower. Thus, when the length of the electrical path (i.e., $L_{RRH1}$) exceeds a length threshold ($L_{min}$), as in FIG. 7A, and when the current exceeds a current threshold, the output having the boost voltage $V_{boost}$ (i.e., the output $O_1$) in some embodiments should be selected and output by the power supply PS instead of the output having the nominal output voltage $V_{out}$ (i.e., the output $O_3$).

It may also be seen that output $O_2$ would be an unacceptable power signal for the (lower) second current $I_2$, since when starting from the boost voltage $V_{boost}$ the lower voltage drop within the electrical path would result in an input power to the remote radio head having a voltage that falls above the acceptable input range $V_{min}$ to $V_{max}$ for the remote radio head, potentially resulting in an overvoltage situation. Thus, even if the length of the electrical path (i.e., $L_{RRH1}$) exceeds a predetermined threshold, if the measured current level is at or below the predetermined current threshold, the power supply PS should output a power signal having the nominal output voltage $V_{out}$ (i.e., the output $O_4$) instead of the higher voltage $V_{boost}$ (i.e., the output $O_2$) to avoid an overvoltage condition.

Also, with reference to the outputs $O_1$ to $O_4$ of FIG. 7B, it may be seen that when the length of the electrical path (i.e., $L_{RRH2}$) is less than or equal to the predetermined threshold ($L_{min}$), outputs from the power supply $O_1$ and $O_2$ having the boost voltage $V_{boost}$ would not be appropriate, since at input to the remote radio head the power signals would have a voltage that would fall above the acceptable input range for the remote radio head, potentially resulting in an overvoltage situation. Thus, when the length of the electrical path (i.e., $L_{RRH1}$) is less than or equal to a predetermined threshold ($L_{min}$), as in FIG. 7B, the power supply PS should output power signals having the lower (nominal) output voltage $V_{out}$ (i.e., the outputs $O_3$ and $O_4$) instead of outputs having the higher boost voltage $V_{boost}$ (i.e., the outputs $O_1$ and $O_2$) to avoid an overvoltage condition.

Generally, the length of the electrical path for a given installation does not vary over time. Once the various equipment is installed at the base station, few (if any) changes are made, except for either replacement of defective or faulty equipment. On the other hand, as discussed above, the amount of current drawn by the remote radio head varies over time, with a remote radio head servicing more user equipment will draw more current than a remote radio head servicing less user equipment.

According to some embodiments, the power supply may comprise a programmable power supply which may (1) receive, as input, a length of an electrical path between the power supply and a remote radio head powered by the power supply (or another equivalent parameter), and (2) if the length exceeds a threshold the power supply may selectively enable a capability of the power supply to output a boost voltage that exceeds a maximum voltage of the remote radio head. The power supply may (3) sense the current being drawn by the remote radio head (or another equivalent parameter), and (4) if the sensed current exceeds a threshold, adjust the voltage of the power signal that is output by the power supply from a nominal output voltage (which may be, for example, the maximum voltage for the power signal that may be input to the remote radio head) to the boost voltage. The power supply may (5) adjust the voltage of the power signal that is output by the power supply from the boost voltage (which may be, for example, the maximum voltage for the power signal that may be input to the remote radio head) to the nominal output voltage if the sensed current is at or below the threshold. Additionally, (6) if the length of the electrical path is at or does not exceed the threshold, then the power supply may not selectively enable the capability of the power supply to output a boost voltage that exceeds a maximum voltage of the remote radio head; in other words, if the length of the electrical path is at or does not exceed the threshold, then the maximum output voltage of the power supply is the maximum input voltage of the remote radio head. The electrical path may be a power cable or cabling connection coupling the power supply and the remote radio head.

In some embodiments, the length of the electrical path may be input to the programmable power supply as user input, along with, for example, the material, and cross-dimension (e.g., wire size) of the electrical path. In some embodiments, the length of the electrical path may be determined by scanning of a bar code that is provided on a jacket of a power cable of the electrical path, or may be retrieved from an RFID chip that is part of the power cable. In some embodiments, the power supply may determine the length of the electrical path by transmitting an electrical pulse toward the remote radio head, and by receiving a reflection of the electrical pulse reflected by a discontinuity or impedance variation near the remote radio head (or even the remote radio head, e.g., at the DC power input of the remote radio head). The time difference between the transmission of the pulse and the reception of the reflection may be used, along with assumptions regarding the material and cross-sectional area of the electrical path. For example, the dielectric constant of the material can be determined and the length estimated based on the time delay of the electrical pulse and the dielectric constant of the material. Since the electrical pulse traverses the electrical path twice (once when the electrical pulse is transmitted to the discontinuity or impedance variation and another when the electrical pulse is reflected back to the transmission point), the time delay is also divided in half.

Thus, the methods, systems, and devices according to embodiments of the present disclosure may detect when conditions are appropriate to boost an output voltage, which may generate significant power savings which may reduce the costs of operating a cellular base station. As shown by Equation (3) above, this will reduce the power loss along the power cable, and hence may reduce the cost of powering the remote radio head. Additionally, since the cellular base stations may use less power, the cellular base stations according to embodiments of the present disclosure may require fewer back-up batteries while maintaining operation for the same period of time during a power outage. This reduction in the amount of back-up batteries may represent a significant additional cost savings.

Embodiments of the present inventive concepts will now be discussed in more detail with reference to FIGS. 3-6, in which example embodiments of the present inventive concepts are shown.

Figure 3:
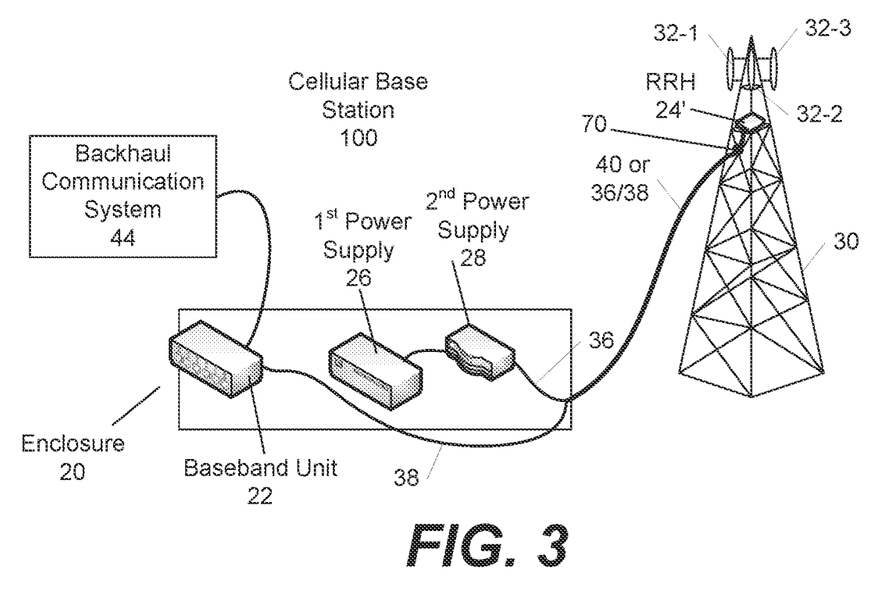
FIG. 3 illustrates a simplified, schematic view of one embodiment of a radio system.

FIG. 3 illustrates a simplified, schematic view of one embodiment of a radio system 100, pedagogically illustrated as a cellular base station. As shown in FIG. 3, the cellular base station 100 includes an equipment enclosure 20 and a tower 30. The tower 30 may be a conventional antenna or cellular tower or may be another structure such as a utility pole or the like. A baseband unit 22, a first power supply 26, and a second power supply 28 may be located within the equipment enclosure 20. Also present within the equipment enclosure 20 may be one or more back-up batteries (not shown). A remote radio head 24' and plurality of antennas 32 (e.g., three sectorized antennas 32-1, 32-2, 32-3) are mounted on the tower 30, typically near the top thereof.

The remote radio head 24' receives digital information and control signals from the baseband unit 22 over a fiber optic cable 38 that is routed from the enclosure 20 to the top of the tower 30. The remote radio head 24' modulates this information into a RF signal at the appropriate cellular frequency, and the RF signal is then transmitted through one or more of the antennas 32. The remote radio head 24' also receives RF signals from one or more of the antennas 32, demodulates these RF signals, and supplies the demodulated signals to the baseband unit 22 over the fiber optic cable 38. The baseband unit 22 processes the demodulated signals received from the remote radio head 24' and forwards the processed signals to the backhaul communications system 44. The baseband unit 22 also processes signals received from the backhaul communications system 44 and supplies them to the remote radio head 24'. Typically, the baseband unit 22 and the remote radio heads 24' each include optical-to-electrical and electrical-to-optical converters that couple the digital information and control signals to and from the fiber optic cable 38.

The first power supply 26 generates a DC voltage. For example, the first power supply 26 may be coupled to alternating current (AC) mains power and may convert the AC voltage into a DC voltage. The DC voltage may be output to the second power supply 28 and/or to the back-up batteries (not shown). The second power supply 28 may include a DC-to-DC converter that accepts the DC voltage output by the first power supply 26 as an input (and/or accepts a DC voltage output by the back-up batteries) and outputs a DC voltage having a different voltage.

A power cable 36 is connected to the output of the second power supply 28 and is bundled together with the fiber optic cable 38 so that the two cables 36, 38 may be routed up the tower 30 as an integral unit. In some embodiments, a hybrid power/fiber optic trunk cable 40 may be routed up the tower 30, and jumper cables (not shown) may be connected between each end of the trunk cable 40 and the baseband units 22, second power supply 28, and remote radio heads 24'. In such embodiments, the power jumper cables and the power portion of the trunk cable 40 comprise the power cable 36. While the first power supply 26 and the second power supply 28 are illustrated as separate power supply units in the embodiment of FIG. 3, it will be appreciated that the two power supplies 26, 28 may be combined into a single power supply unit in other embodiments.

In some embodiments, an impedance variation 70 may be located within the electrical path between the second power supply 28 and the remote radio head 24', which may be used to determine a length of the electrical path. For example, the impedance variation 70 may be located at a power input port of the remote radio head 24', or at a surge arrestor (not shown) within the electrical path.

As noted above, pursuant to embodiments of the present inventive concepts, DC power supplies are provided that may deliver a power signal to a remote radio head 24' with reduced power loss. In the embodiment of FIG. 3, the second power supply 28 includes a programmable power supply that receives an input DC voltage from first power supply 26 and outputs a DC voltage to the power cable 36.

The remote radio heads 24' may be designed to be powered by a 48 Volt (nominal) DC voltage. While the minimum DC power signal voltage at which the remote radio head 24' will operate and the maximum DC power signal voltage that may be provided safely to the remote radio head 24' without the threat of damage to the remote radio head 24' vary, but some examples include a 38 Volt minimum DC voltage and a 56 Volt maximum DC voltage. Thus, according to some embodiments, the programmable second power supply 28 may be designed to output a DC voltage having a voltage of, for example, at least 56 Volts, such that, due to voltage drop over the power cable, the DC voltage when received at the far end of the power cable 36 is approximately the maximum DC voltage of the remote radio head 24', in order to reduce the power loss associated with the voltage drop that the DC voltage experiences traversing the power cable 36.

Pursuant to some embodiments, the second power supply 28 may be configured to vary the DC voltage output by the second power supply 28 in response to the measured current drawn from the second power supply 28. For example, the second power supply 28 may output a DC voltage having a nominal output voltage if the current drawn by the remote radio head 24' is at or below a threshold. The nominal output voltage may be equal to the maximum input voltage of the remote radio head 24'. The second power supply 28 may output a boost DC voltage if the current drawn by the remote radio head 24' is above a threshold. The boost DC voltage generated by the second power supply 28 may be set, for example, so that the output voltage exceeds the maximum input voltage of the remote radio head 24'. If the output voltage is set to be at or above the maximum specified voltage of the remote radio head 24', then the power loss associated with supplying the DC voltage to the remote radio head 24' over the power cable 36 may be reduced, since the higher DC voltage will correspondingly reduce the current that is supplied over the power cable 36. However, the voltage drop over the power cable 36 will result in the DC voltage being within the range $V_{min}$ to $V_{max}$, where $V_{min} < V_{nom} < V_{max}$, $V_{min}$ is the minimum input voltage for the remote radio head 24', $V_{nom}$ is the recommended input voltage for the remote radio head 24', and $V_{max}$ is the maximum input voltage for the remote radio head 24'.

Pursuant to some embodiments, and with reference to the discussion of FIGS. 7A and 7B, the programmable power supply 28 may be configured to selectively enable a capability of the programmable power supply 28 to output a boost voltage that exceeds a maximum voltage of the remote radio head 24'. For example, the programmable power supply 28 may receive input of a length of an electrical path between the programmable power supply 28 and a remote radio head 24' powered by the programmable power supply 28 (or other equivalent parameter) and (2) selectively enable a capability of the programmable power supply 28 to output a boost voltage that exceeds a maximum voltage of the remote radio head 24' only if the length exceeds a length threshold. This selective enabling of the capability to output a boost voltage that exceeds a maximum voltage of the remote radio head 24' may limit or prevent overvoltage situations where a power signal having too high of a voltage for the remote radio head 24' is outputted by the programmable power supply 28.

Figure 4:
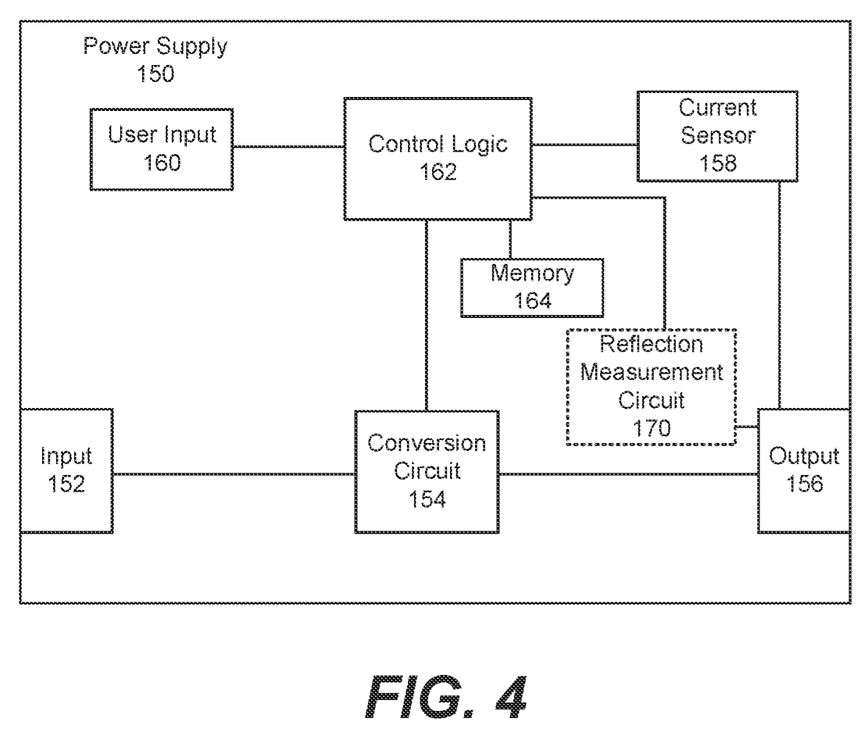
FIG. 4 illustrates a schematic block diagram of one embodiment of a programmable power supply.

FIG. 4 is a block diagram of a programmable power supply 150 which may include a DC-to-DC converter according to some embodiments that may be used as the second power supply 28 of FIG. 3. As shown in FIG. 4, the programmable power supply 150 includes an input (or input conductors) 152, a conversion circuit 154 and an output (or output conductors) 156. The programmable power supply 150 further includes a current sensor 158, a user input 160, control logic (circuitry) 162 and memory (circuitry) 164.

The input (input conductors) 152 may receive a DC voltage such as the DC voltage output by first power supply 26 of FIG. 3. The DC voltage that is received at input 152 may have a relatively constant voltage in some embodiments. The conversion circuit 154 may be a circuit that is configured to convert the voltage received at input 152 to a different DC voltage. A wide variety of DC conversion circuits may be used, including, for example, electronic, electrochemical and electromechanical conversion circuits. Suitable electronic circuits using inductors or transformers can be used to provide high efficiency voltage conversion. The output 156 may output the converted DC voltage.

The current sensor 158 may be any appropriate circuit that senses the current level of the DC voltage output through the output 156. For example, the current sensor 158 may be implemented using a resistor having a known value along the power supply conductor or the return conductor internal to the programmable power supply 150, along with a voltage meter that measures the voltage drop across the resistor, and the current may then be calculated according to Ohm's Law. The current sensor 158 may be or may include a Hall-effect sensor. It will also be appreciated that the current sensor 158 may be located external to the programmable power supply 150 in other embodiments. The current drawn by the remote radio head 24' may vary over time depending upon, for example, the number of carriers that are transmitting at any given time and whether the remote radio head 24' is in a steady-state mode, powering up or rebooting. The current sensor 158 may sense the current level of the DC voltage at the output (output conductors) 156 and provide the sensed current level to the control logic 162.

The control logic 162 may adjust one or more parameters of the conversion circuit 154 so as to adjust the DC voltage output through output 156. In some embodiments, the control logic 162 and the conversion circuit 154 may be configured to output either a nominal output voltage or a different, higher boost voltage based on whether a capability of the programmable power supply 150 is enabled and based on an amount of current drawn by the remote radio head 24'. For example, if the capability is enabled, the control logic 162 may adjust one or more parameters of the conversion circuit 154 so as to output through output 156 a nominal DC voltage if the current drawn by the remote radio head 24' is at or below a threshold, or a boost DC voltage if the current drawn by the remote radio head 24' is above the threshold value. The boost voltage may be higher than the nominal output voltage. If the capability of the programmable power supply 150 is not enabled, the control logic 162 may adjust one or more parameters of the conversion circuit 154 so as to output through output 156 a nominal DC output voltage regardless as to whether the current drawn by the remote radio head 24' is above, at, or below the threshold value.

In some embodiments, the control logic 162 may be configured to change the voltage level from the boost voltage level to the nominal voltage level in response to the measured current being less than the threshold value.

To avoid hysteresis and oscillating between the two output voltages, multiple threshold values may be used. For example, the threshold value may be a first threshold value, and the control logic 162 may be configured to change the voltage level from the boost output voltage level to the nominal voltage level when the measured current level is less than or equal to a second threshold value that is less than the first threshold value.

As noted above, in some embodiments, the capability of the programmable power supply 150 to output the boost voltage may be enabled (or not enabled) based on the resistance of the electrical path between the programmable power supply 150 and the remote radio head 24', as the resistance of the electrical path and the current drawn are variables that determine the voltage drop that the DC voltage will experience traversing the power cable 36. In some embodiments, the user input 160 to the programmable power supply 150 may allow a user to input properties of the power cable 36 such as the length, size, and material of the conductor of the power cable 36. For example, the user may input physical characteristics of the power cable 36 such as size, length, conductor material, model number, etc., and algorithms, equations, look-up tables, and the like that are stored in the memory 164 of the programmable power supply 150 may be used to calculate or estimate the resistance of the power cable 36. In still other embodiments, the resistance of the power cable 36 may already be known because it was measured or otherwise determined a priori, for example, by the cable manufacturer. By way of example, the power cable 36 may have the resistance printed on the jacket thereof, coded into a bar code that is provided on the power cable 36 or stored in an RFID chip that is part of the power cable.

In some embodiments, the second power supply 28 of FIG. 3 may be configured to identify a length of the power cable 36, which may serve as a proxy or substitute value for the resistance of the power cable 36. In other words, the cross-sectional area and material of the power cable 36 may be assumed and/or default values may be selected therefor, and the length of the power cable 36 may be used in lieu of determining the resistance of the power cable 36. For example, the second power supply 28 of FIG. 3 may optionally include a reflection measurement circuit 170 that may be used to measure a length of the power cable 36. The reflection measurement circuit 170 may be implemented in a variety of ways. For example, in some embodiments, the reflection measurement circuit 170 may transmit a voltage pulse onto the power cable 36 and measure a time between the transmission and a reception of a reflected return pulse. The return pulse may be the result of an impedance variation at a discontinuity 70 (see FIG. 3) at the far end of the power cable 36. The control logic 162 may then calculate the length of the power cable 36 based on the travel time of the pulse, and store the calculated length in the memory 164 and/or compare the calculated length with a stored length in the memory 164 to determine whether to enable the capability of the second power supply 28 to output a boost voltage. In other embodiments, at the far end of the power cable 36 the two conductors thereof may be shorted and a voltage pulse may again be transmitted through the power cable 36. The control logic 162 may again calculate the length of the power cable 36 based on the travel time of the pulse, and store the calculated length in the memory 164 and/or compare the calculated length with a stored length in the memory 164 to determine whether to enable the capability of the second power supply 28 to output the boost voltage. Other ways of measuring the length of a wire segment are known to those of skill in the art and may be used instead of the example methods listed above.

While FIG. 4 illustrates a programmable power supply 150 that comprises a DC-to-DC converter, it will be appreciated that in other embodiments an AC-to-DC converter may be used instead. In such embodiments, the input 152 receives an alternating current ("AC") voltage and the conversion circuit 154 converts the AC voltage to a DC voltage and may further adjust the DC voltage that is output through output 156 to an appropriate level in the manner discussed above.

A method of enabling a capability of a power supply to output a boost DC voltage to a radio may be mounted on a tower of a cellular base station will now be described with reference to the flow chart of FIG. 5. The method may be implemented via the techniques described with respect to FIGS. 1-4, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Figure 5:
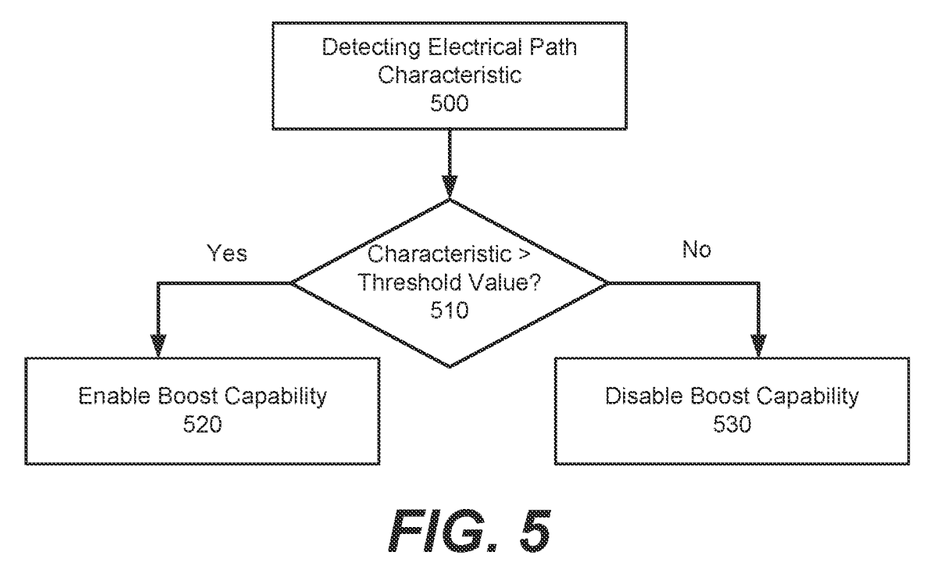
FIG. 5 illustrates a flow diagram of one embodiment of a method for implementing boost capability based on an electrical path characteristic.

As shown in FIG. 5, operations may begin with the power supply detecting (e.g., by detection circuitry) a value of a characteristic of an electrical path between the power supply and a remote radio head powered by the power supply via the electrical path (block 500). In some embodiments, the characteristic value may be received via a user inputting information to a programmable power supply which may be used by the programmable power supply to detect or determine a length or resistance of the electrical path. This information may comprise, for example, an electrical resistance of a cabling connection between the power supply and the radio or information regarding the characteristics of the cabling connection that may be used to calculate this resistance. Alternatively, the detection circuitry (e.g. reflection measurement circuit 170) may transmit a voltage pulse onto the power cable and measure a time between the transmission and a reception of a reflected return pulse. The return pulse may be the result of an impedance variation at a discontinuity (see FIG. 3) at the far end of the power cable. The time measurement may be used to calculate the characteristic value, which may be a length of the electrical path between the power supply and the remote radio head powered by the power supply via the electrical path.

The detected characteristic value may be compared with a threshold value stored in memory (e.g., the memory 164) (block 510). If the detected characteristic value is greater than the threshold value ("Yes" branch from block 510), then the programmable power supply may enable (block 520) a capability of the programmable power supply to enable a boost DC voltage if the current drawn by the remote radio head is at or below a threshold. On the other hand, if the detected characteristic value is less than or equal to the threshold value ("No" branch from block 510), then the programmable power supply may disable or not enable (block 530) the capability of the DC power supply to output the boost voltage if the current drawn by the remote radio head is above the threshold value.

Figure 6A:
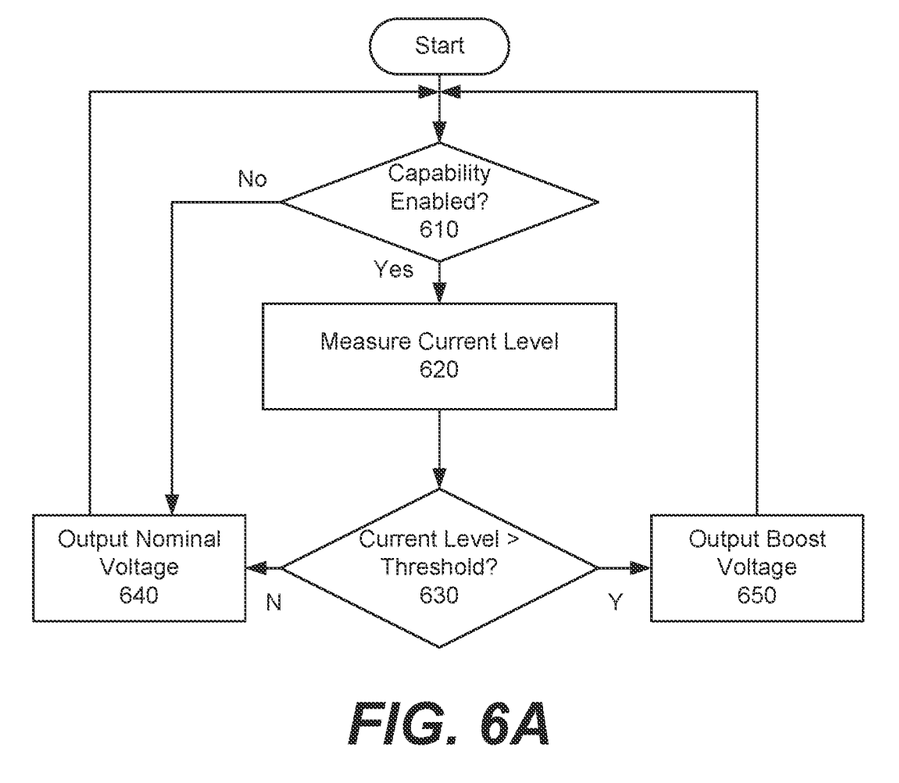
FIGS. 6A and 6B illustrate flow diagrams of embodiments of methods for generating a boosted DC voltage.

Methods of powering a radio that is mounted on a tower of a cellular base station will now be described with reference to the flow charts of FIGS. 6A, and 6B. In FIG. 6A, the method may begin, optionally, by determining whether a capability of the DC power supply to output the boost output voltage if the current drawn by the remote radio head is above the threshold value has been enabled (block 610). If the capability has not been enabled ("No" branch from block 610), then a nominal DC voltage may be output from the power supply regardless of the current drawn by the remote radio head. Otherwise, ("Yes" branch from block 610), the current that is output may then be measured (block 620). If optional block 610 is not performed, then block 620 is performed. The programmable power supply may then automatically adjust an output voltage level by the power supply based on a comparison in the measured output current with a threshold value (block 630). For example, the control logic of the power supply may adjust one or more parameters of the conversion circuit so as to output a nominal DC voltage (block 640) if the current drawn by the remote radio head is at or below a threshold value ("No" branch from block 630) or a boost DC voltage (block 650) if the current drawn by the remote radio head is above the threshold value ("Yes" branch from block 630). The boost DC voltage may be higher than the nominal DC voltage. In some embodiments, the boost DC voltage may be a voltage that is at least 4 Volts higher than a nominal DC voltage, although the present disclosure is not limited thereto.

As shown in FIG. 6A, blocks 610-650 may be performed continuously at appropriate intervals in order to select between the nominal DC voltage and the boost DC voltage responsive to changes in the measured current.

Figure 6B:
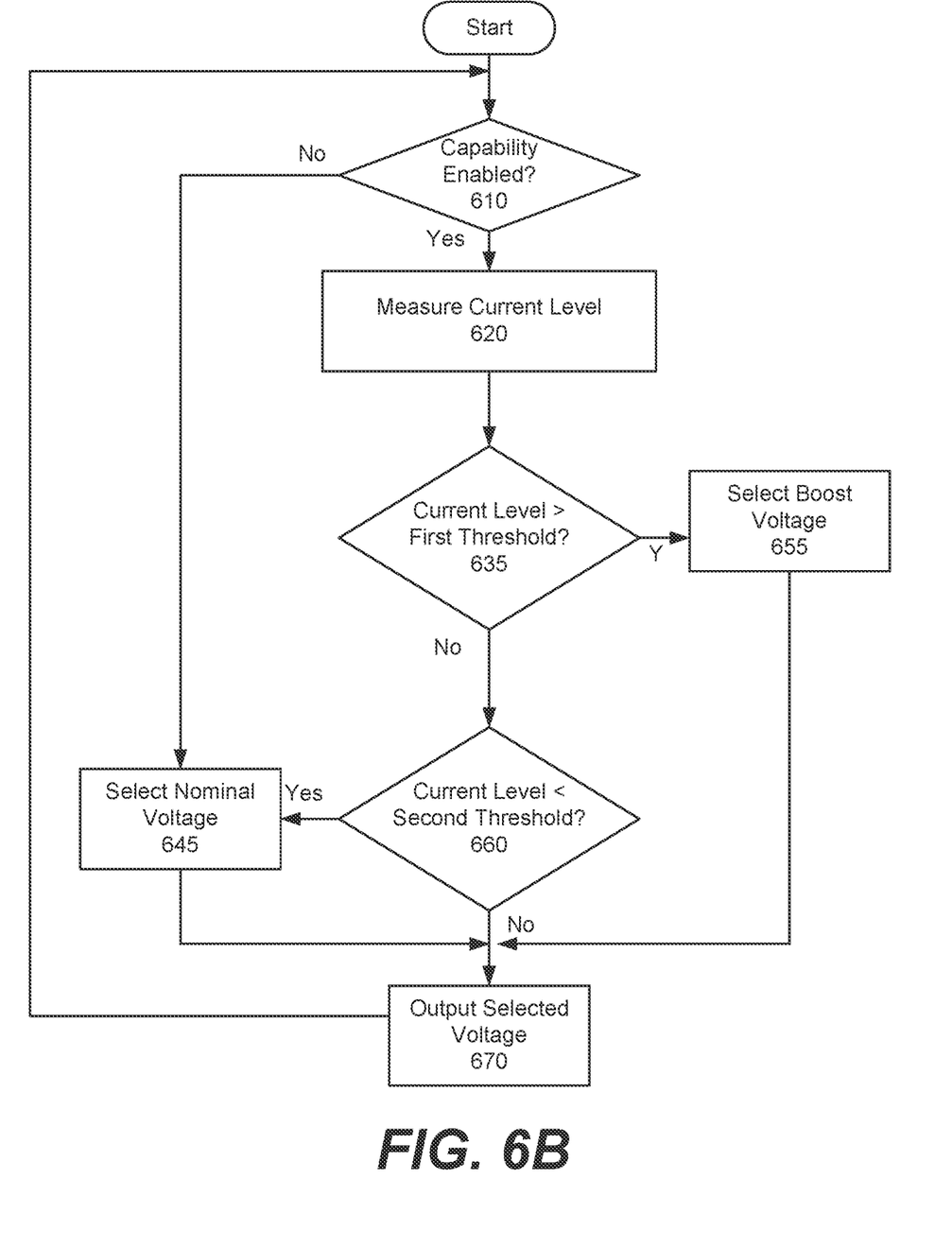

In FIG. 6B, multiple threshold values may be used to avoid potential fluctuations in the voltage when the current level is near the single threshold value of FIG. 6A. In FIG. 6B, the method may begin by determining whether the capability of the DC power supply to output the boost DC voltage if the current drawn by the remote radio head is above the threshold value has been enabled (block 610). If the capability has not been enabled ("No" branch from block 610), then the nominal DC voltage may be selected regardless of the current drawn by the remote radio head. The nominal DC voltage may be selected as a default value. Otherwise, ("Yes" branch from block 610), the output current may then be measured (block 620). The programmable power supply may then perform a comparison of the measured output current with a first threshold value (block 635). If the current drawn by the remote radio head is above the first threshold value ("Yes" branch from block 635), then the boost DC voltage may be selected for output (block 655). Otherwise ("No" branch from block 635), the programmable power supply may then perform a comparison in the measured output current with a second threshold value (block 660). The second threshold value may be less than the first threshold value. If the current drawn by the remote radio head is less the second threshold value ("Yes" branch from block 660), then the nominal DC voltage may be selected for output (block 645). Otherwise (i.e., the current is greater than the second threshold value but less than the first threshold value), no change in the voltage from the previously selected boost DC voltage or the previously selected nominal DC voltage is made. The selected voltage is then output (block 670).

As shown in FIG. 6B, blocks 610-670 may be performed continuously at appropriate intervals in order to select between the nominal DC voltage and the boost DC voltage responsive to changes in the measured current.

While embodiments of the present inventive concepts are primarily described above with respect to cellular base stations that have conventional antenna towers, it will be appreciated that the techniques and systems described herein may be applied to a wide variety of other cellular systems. For example, cellular service is often provided in tunnels by locating the baseband equipment and power supply in an enclosure and then connecting this equipment to remote radio heads and antennas via long horizontal trunk cables. Very long cabling connections may be used in some instances, and the voltage drop along the cable may be particularly problematic in such installations. Similarly, in some metrocell architectures, the same concept is applied above-ground, with the remote radio heads and antennas typically mounted on smaller, pre-existing structures such as utility poles, buildings and the like. Once again, the trunk cables connecting the baseband equipment and power supplies to the distributed remote radio heads and antennas may be very long (e.g., a kilometre or more in some cases), and hence voltage drop likewise may be a significant problem. Any of the above-described embodiments of the present disclosure may be used in these or similar applications.

The present inventive concepts have been described with reference to the accompanying drawings, in which certain embodiments of the inventive concepts are shown. The inventive concepts may, however, be embodied in many different forms and should not be construed as limited to the embodiments that are pictured and described herein; rather, these embodiments are provided so that this disclosure will be thorough and complete, and will fully convey the scope of the inventive concepts to those skilled in the art. Like numbers refer to like elements throughout the specification and drawings. It will also be appreciated that the embodiments disclosed above can be combined in any way and/or combination to provide many additional embodiments.

It will be understood that, although the terms first, second, etc. are used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "and/or" includes any and all combinations of one or more of the associated listed items.

Unless otherwise defined, all technical and scientific terms that are used in this disclosure have the same meaning as commonly understood by one of ordinary skill in the art to which the inventive concepts belongs. The terminology used in the above description is for the purpose of describing particular embodiments only and is not intended to be limiting of the inventive concepts. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

In the description above, when multiple units of an element are included in an embodiment, each individual unit may be referred to individually by the reference numeral for the element followed by a dash and the number for the individual unit (e.g., antenna 32-2), while multiple units of the element may be referred to collectively by their base reference numeral (e.g., the antennas 32).

It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

The processing functions described herein may be performed by one or more microprocessors, microcontrollers, digital signal processing (DSP) elements, application-specific integrated circuits (ASICs), and/or field programmable gate arrays (FPGAs). Processing circuitry (e.g., control logic circuitry) may include or function with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory functions (e.g. memory circuitry) described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to control logic circuitry, and executed by the control logic circuitry. Generally, program modules or applications include routines, programs, objects, data components, data structures, algorithms, and the like, which perform particular tasks or implement particular abstract data types.

In the drawings and specification, there have been disclosed typical embodiments of the inventive concepts and, although specific terms are employed, they are used in a generic and descriptive sense only and not for purposes of limitation, the scope of the inventive concepts being set forth in the following claims.

The terms "about" or "substantially" mean that the value or parameter specified may be somewhat altered, as long as the alteration does not result in nonconformance of the process or structure to the illustrated embodiment from the perspective of one having ordinary skill in the art. For instance, unless otherwise indicated, a numerical quantity modified by the term "substantially" can be altered to within ±20% of the specified value. Finally, the term "exemplary" merely indicates the accompanying description is used as an example, rather than implying an ideal, essential, or preferable feature of the invention.

Example Embodiments

Example 1 includes a power system, comprising: input conductors configured to receive a first direct current (DC) voltage level; output conductors configured to provide a DC voltage to a first end of a power cable electrically coupled to a radio; a current sensor electrically coupled to the output conductors, the current sensor configured to measure a current flowing through the output conductors; and a converter circuit electrically coupled to the input conductors and the output conductors, the converter circuit configured to change the first DC voltage level to a second DC voltage level in response to the measured current being greater than a first threshold level, wherein the second DC voltage level is greater than the first DC voltage level, wherein the output conductors are configured to provide at least one of the first DC voltage level and the second DC voltage level.

Example 2 includes the power system of Example 1, wherein the converter circuit is further configured to change the DC voltage from the second DC voltage level to the first DC voltage level in response to the measured current being less than (1) the first threshold level, or (2) less than or equal to a second threshold level that is less than the first threshold level.

Example 3 includes the power system of any of Examples 1-2, wherein the second DC voltage level exceeds a maximum input voltage of the radio.

Example 4 includes the power system of any of Examples 1-3, wherein the first DC voltage level is within a predetermined range of a maximum input voltage of the radio.

Example 5 includes the power system of any of Examples 1-4, further comprising control logic circuitry coupled to the converter circuit, wherein the control logic circuitry is configured to enable selectively a capability of the converter circuit to change the DC voltage.

Example 6 includes the power system of Example 5, wherein the control logic circuitry is configured to enable selectively the capability based on a user input.

Example 7 includes the power system of any of Examples 5-6, further comprising detection circuitry configured to detect a characteristic of an electrical path between and including the output and the radio, and wherein the control logic circuitry is configured to enable selectively the capability based on the detected characteristic.

Example 8 includes the power system of Example 7, wherein the detected characteristic is a length of the electrical path.

Example 9 includes the power system of any of Examples 7-8, wherein the detected characteristic is an amount of time between transmission of an electrical pulse by the detection circuitry via the electrical path and reception at the output of a reflection of the electrical pulse resulting from an impedance variation within the electrical path.

Example 10 includes the power system of Example 9, wherein the impedance variation is located at a power input port of the radio or at a surge arrestor within the electrical path.

Example 11 includes a power system, comprising: input conductors configured to receive a first direct current (DC) voltage level; output conductors configured to provide a DC voltage to a first end of a power cable; detection circuitry electrically coupled to the output conductors, the detection circuitry configured to detect a characteristic of an electrical path between and including the output conductors and a radio electrically coupled to the output conductors through a power cable; control logic circuitry electrically coupled to the detection circuitry; a converter circuit electrically coupled to the input conductors and the output conductors, the converter circuit configured to change the first DC voltage level to a second DC voltage level based on control signals received from the control logic circuitry, wherein the second DC voltage level is greater than the first DC voltage level; and wherein the control logic circuitry configured to selectively enable a capability of the converter circuit to change from the first DC voltage level to the second DC voltage level based on the detected characteristic, wherein the output conductors are configured to provide at least one of the first DC voltage level and the second DC voltage level.

Example 12 includes the power system of Example 11, wherein the converter circuit is configured to change the voltage level from the first DC voltage level to the second DC voltage level when the capability is enabled.

Example 13 includes the power system of any of Examples 11-12, wherein the control logic circuitry is configured to enable the capability of the converter circuit when the detected characteristic exceeds a first threshold value, and wherein the control logic circuitry is configured to disable the capability of the converter circuit when the detected characteristic is below a second threshold value.

Example 14 includes the power system of any of Examples 11-13, wherein the detected characteristic is an amount of time between transmission of an electrical pulse by the detection circuitry via the electrical path and reception at the output of a reflection of the electrical pulse resulting from an impedance variation within the electrical path.

Example 15 includes a method comprising: measuring a current at a power cable coupled to an output of a power system, the output configured to provide a direct current (DC) voltage to a radio through the power cable; and changing the DC voltage of the output from a first voltage level to a second voltage level that is greater than the first voltage level in response to the measured current being greater than a first threshold value.

Example 16 includes the method of Example 15, further comprising: changing the DC voltage of the output from the second voltage level to the first voltage level in response to the measured current being (1) less than the first threshold value, or (2) being less than or equal to a second threshold value that is less than the first threshold value.

Example 17 includes the method of any of Examples 15-16, further comprising providing the first voltage level to the radio when the measured current is greater than the first threshold value; and providing the second voltage level to the radio when the measured current is less than or equal to the first threshold value.

Example 18 includes the method of any of Examples 15-17, wherein the second voltage level exceeds a maximum input voltage of the radio.

Example 19 includes the method of any of Examples 15-18, wherein the first voltage level is within a predetermined range of a maximum input voltage of the radio.

Example 20 includes a method comprising: detecting a characteristic of an electrical path between and including an output of a power system and a radio at the output of the power system, the output configured to be coupled to the radio through a power cable; selectively enabling a capability of the power system to change a direct current (DC) voltage of the output based on the detected characteristic; and changing the DC voltage from a first voltage level to a second voltage level that is greater than the first voltage level when the capability of the power system is selectively enabled.

Example 21 includes the method of Example 20, wherein the first voltage level is within a predetermined range of a maximum input voltage of the radio, and wherein the second voltage level is a maximum input voltage of the radio.

Example 22 includes the method of any of Examples 20-21, wherein detecting the characteristic of the electrical path between the power system and the radio comprises: transmitting an electrical pulse via the electrical path; and receiving a reflection of the electrical pulse from an impedance variation within the electrical path, wherein the characteristic comprises an amount of time between the transmitting of the electrical pulse by the power system via the electrical path and the receiving by the power system of the reflection of the electrical pulse.

Example 23 includes the method of any of Examples 20-22, wherein enabling the capability of the power system to change a DC voltage level is based on a user input.

Example 24 includes the method of any of Examples 20-23, wherein the characteristic is a length of the electrical path.

Example 25 includes the method of any of Examples 20-24, further comprising outputting the second voltage level when the capability of the power system is selectively enabled; and outputting the first voltage level when the capability of the power system is not selectively enabled.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A power system, comprising:
    input conductors configured to receive a first direct current (DC) voltage level;
    output conductors configured to provide a DC voltage to power conductors electrically coupled to a radio;
    a current sensor electrically coupled to the output conductors, the current sensor configured to measure a current flowing through the output conductors; and
    circuitry electrically coupled to the input conductors and the output conductors, the circuitry configured to:
        determine whether a measured current, flowing though the output conductors, exceeds a first DC threshold level;
        determining that the measured current exceeds the first DC threshold level, then convert the first DC voltage level to a second DC voltage level and provide the second DC voltage level across the output conductors, wherein an absolute value of the second DC voltage level is greater than an absolute value of the first DC voltage level; and
        determining that the measured current does not exceed the first DC threshold level, then provide the first DC voltage level across the output conductors.

2. The power system of claim 1, wherein provide the first DC voltage level further comprises determining whether the measured current is less than or equal to a second DC threshold level that is less than the first DC threshold level, and determining that that the measured current is less than or equal to the second DC threshold level, then provide the first DC voltage level across the output conductors.

3. The power system of claim 1, wherein an absolute value of the second DC voltage level exceeds an absolute value of a maximum input voltage specification of the radio.

4. The power system of claim 1, wherein the first DC voltage level is within a predetermined range of a maximum input voltage specification of the radio.

5. The power system of claim 1, wherein the circuitry is further configured to enable selectively a capability of the circuitry to change the DC voltage.

6. The power system of claim 5, wherein the circuitry is configured to enable selectively the capability based on a user input.

7. The power system of claim 5, wherein the circuitry is further configured to detect a characteristic of an electrical path between and including the output conductors and the radio, and wherein the circuitry is further configured to enable selectively the capability based on the detected characteristic.

8. The power system of claim 7, wherein the detected characteristic is a length of the electrical path.

9. The power system of claim 7, wherein the detected characteristic is an amount of time between transmission of an electrical pulse by the circuitry via the electrical path and reception of a reflection of the electrical pulse resulting from an impedance variation within the electrical path.

10. The power system of claim 9, wherein the impedance variation is located at a power input port of the radio or at a surge arrestor within the electrical path.

11. A power system, comprising:
input conductors configured to receive a first direct current (DC) voltage level;
output conductors configured to provide a DC voltage to power conductors; and
circuitry coupled to the input conductors and the output conductors, and configured to (a) detect a characteristic value of an electrical path between the power system and a radio electrically coupled to the output conductors through the power conductors, (b) determine whether the characteristic value crosses a first threshold level, (c) determining that the characteristic value crosses the first threshold level, then convert the first DC voltage level to a second DC voltage level and provide the second DC voltage level across the output conductors, and (d) determining that the characteristic value does not cross the first threshold level, then provide the first DC voltage level across the output conductors.

12. The power system of claim 11, wherein crosses or cross the first threshold level means respectively exceeds or exceed the first threshold level.

13. The power system of claim 11, wherein provide the first DC voltage level further comprises determine whether the characteristic value is below a second threshold level, and determining that the characteristic value is below the second threshold level, then provide the first DC voltage level across the output conductors.

14. The power system of claim 11, wherein the detected characteristic is an amount of time between transmission of an electrical pulse by the circuitry via the electrical path and reception of a reflection of the electrical pulse resulting from an impedance variation within the electrical path.

15. A method comprising:
measuring a current at an output of a power system, the output configured to provide a direct current (DC) voltage to a radio through power conductors;
determining whether a measured current, flowing though the output, exceeds a first DC threshold level;
determining that the measured current exceeds the first DC threshold level, then converting the first DC voltage level to a second DC voltage level and providing the second DC voltage level at the output, wherein an absolute value of the second DC voltage level is greater than an absolute value of the first DC voltage level; and
determining that the measured current either does not exceed the first DC threshold level, then providing the first DC voltage level across the output.

16. The method of claim 15, wherein providing the first DC voltage level comprises determining whether the measured current is less than or equal to a second DC threshold value that is less than the first DC threshold value, and determining that the measured current is less than or equal to the second DC threshold value, then providing the first DC voltage level across the output conductors.

17. The method of claim 15, wherein an absolute value of the second DC voltage level exceeds an absolute value of a maximum input voltage specification of the radio.

18. The method of claim 15, wherein the first DC voltage level is within a predetermined range of a maximum input voltage specification of the radio.

19. A method comprising:
receiving a first direct current (DC) voltage at an input of a power system;
detecting a value of a characteristic of an electrical path between an output of the power system and a radio coupled to the output of the power system, the output configured to be coupled to the radio through power conductors;
determining whether the characteristic value crosses a first threshold level;
determining that the characteristic value crosses the first threshold level, then converting the first DC voltage level to a second DC voltage level and providing the second DC voltage level across the output; and
determining that the characteristic value does not cross the first threshold level, then providing the first DC voltage level across the output.

20. The method of claim 19, wherein the first DC voltage level is within a predetermined range of a maximum input voltage specification of the radio.

21. The method of claim 19, wherein detecting the characteristic of the electrical path between the power system and the radio comprises:
transmitting an electrical pulse via the electrical path; and
receiving a reflection of the electrical pulse from an impedance variation within the electrical path,
wherein the characteristic comprises an amount of time between the transmitting of the electrical pulse by the power system via the electrical path and the receiving by the power system of the reflection of the electrical pulse.

22. The method of claim 19, wherein crosses or cross the first threshold level means respectively exceeds or exceed the first threshold level.

23. The method of claim 19, wherein the characteristic is a length of the electrical path.

24. The method of claim 19, wherein an absolute value of the second DC voltage level exceeds an absolute value of a maximum input voltage specification of the radio.

* * * * *